United States Patent [19]
Frye et al.

[11] Patent Number: 5,202,610
[45] Date of Patent: Apr. 13, 1993

[54] METHOD AND APPARATUS FOR YARN END-DOWN DETECTION IN A TEXTILE YARN WINDING MACHINE

[75] Inventors: Jesse C. Frye, Cliffside, N.C.; Scott G. Bradshaw, Chester, Va.

[73] Assignee: Platt Saco Lowell, Greenville, S.C.

[21] Appl. No.: 752,379

[22] Filed: Aug. 30, 1991

[51] Int. Cl.$^5$ ............................................. B65H 59/38
[52] U.S. Cl. ...................... 318/6; 318/456; 318/461; 66/157; 388/813
[58] Field of Search .................. 318/6, 264, 272, 432, 318/434, 456, 466, 461; 388/800, 804–806, 809–815, 903, 906, 930, 907.5; 66/157, 163; 57/78–81, 88

[56] References Cited

U.S. PATENT DOCUMENTS

| | | | |
|---|---|---|---|
| 3,571,680 | 3/1971 | Tellerman et al. | 318/6 |
| 3,805,244 | 4/1974 | Tooka | 318/6 X |
| 3,813,583 | 5/1974 | Akiyama | 307/304 X |
| 4,063,304 | 12/1977 | Ogura et al. | 361/242 X |

FOREIGN PATENT DOCUMENTS 2218117A 11/1989 United Kingdom .
2229457A 9/1990 United Kingdom .
2229458A 9/1990 United Kingdom .

OTHER PUBLICATIONS

IEE Power Electronics & Variable-Speed Drives Conference, London, Jul. 1988; paper entitled "Four-Quadrant Brushless Reluctance Motor Drive", T. J. E. Miller et al., published Jul. 1988, (4 pages).

IEE Power Electronics & Variable-Speed Drives Conference, London, Jul. 1990; paper entitled "A New Control IC For Switched Reluctance Motor Drives", T. J. E. Miller et al., published Jul. 1990 (5 pages).

Primary Examiner—William M. Shoop, Jr.
Assistant Examiner—David Martin
Attorney, Agent, or Firm—Luke J. Wilburn, Jr.

[57] ABSTRACT

Method and apparatus for detecting breakage in a yarn strand being wound onto a yarn support member rotatably driven by a DC motor and having a closed-loop motor control system for maintaining a desired velocity of the motor and for signaling commutation of the phases of the motor during the yarn winding operation. The closed-loop motor control system monitors the signal conduction angles delivered to commutate the phase windings of the motor, detects a sudden minimum pre-established decrease in the monitored conduction angles, and generates a control signal in response to a sudden decrease in the conduction angle resulting from a yarn strand breakage. The control signal may be employed to stop current supply to the motor.

8 Claims, 12 Drawing Sheets

METHOD AND APPARATUS FOR YARN END-DOWN DETECTION IN A TEXTILE YARN WINDING MACHINE

This invention is directed to method and apparatus for detecting a break of a yarn strand being wound onto a yarn package in a textile winding operation, and, more particularly, to method and apparatus for detecting yarn strand breakage by detecting changes in motor operating conditions of a motor-driven yarn package winding device.

BACKGROUND OF THE INVENTION

It is a known practice in textile yarn winding and spinning operations to employ mechanical or optical sensing devices located in the path of the yarn strand to a yarn collection point or takeup station to detect a break of the yarn strand and provide signals to stop the yarn takeup drive motor. The yarn strand break may be repaired and the winding station drive motor restarted.

Such "end down" yarn detection and sensing means located in the yarn strand path to detect breakage necessarily requires optical, electrical, or mechanical sensors which employ related circuitry and signal means to indicate the break and/or stop the motor driving the yarn takeup device.

It also has been proposed in textile yarn strand winding apparatus to monitor the operating conditions of the individual drive motor of each yarn takeup station to sense change in motor conditions resulting from a yarn break and stop the drive motor when the yarn break occurs.

Great Britain Patent Application 2218-117-A, published Nov. 8, 1989 discloses a yarn break detection device for a textile unit having an electrical drive motor whereby the power consumption to the motor is measured and compared to a reference value. If the consumption falls rapidly below a set minimum value, a stop motion signal switches off the unit.

Brushless DC motors without permanent magnets have been proposed for driving the individual spindle assemblies of a textile yarn ring spinning frame. In such spindle assemblies, the rotor of the motor is mounted on the spindle shaft which supportably rotates a yarn collection member, such as a bobbin, during the spinning operation. A ring rail with ring and traveler reciprocates vertically along the support bobbin to wind the yarn package. The lower end of the spindle support shaft is supported for rotation in a bolster section which has an outer housing mounted in fixed position to a spindle assembly support rail of the spinning frame. The stator of the motor is disposed in surrounding relation to the reactor and is mounted in fixed position in a housing supportably attached in suitable manner to the bolster housing or support rail of the ring spinning frame.

Brushless DC motors without permanent magnets often are interchangeably referred to as switched reluctance (SR) or variable reluctance (VR) motors. Reference to a VR motor herein is intended to include both terminologies. A VR motor has two sets of salient poles, one set on the stator which has phase windings around the poles and another set on the rotor which has no windings. The stator phase windings are sequentially energized with current pulses to rotate the rotor which is connected to a shaft output. The stator phase windings are sequenced, or commutated, by signals from a rotor position sensor. The rotor position sensing means may comprises optical sensors or magnetic sensors of the Hall effect type. The sensors typically are mounted in a fixed position on the stator or motor housing adjacent the path of rotation of the rotor, and the sensed means are fixed for rotation with the rotor.

In a typical three-phase, VR motor, three Hall effect sensors may be located 120° arcuately apart, centered about the rotor shaft, and are fixed directly to the stator or to some fixture which locates them according to some known relationship with respect to the stator. A magnetic ring with four North regions and four South regions alternating in 45° radial arcs of the ring are attached to the rotor or rotor shaft and serve as sensed means so that when the rotor rotates, sensor output signals can be used to directly commutate, i.e., cut on and off, the current to each of the motor phase windings as they locate each and every pole alignment.

It is known to provide control systems for adjusting various parameters of motor operation of a VR motor, such as speed, torque, phase communication, phase advance, and efficiency of the motor. Certain of such systems employ analog or digital memory to store optimum control parameters relating to switching angles to demand speed and operating torque. Certain other control systems employ theoretical equations derived to predict optimum phase advance as a function of speed.

BRIEF OBJECTS OF THE INVENTION

It is an object of the present invention to provide method and apparatus for detecting yarn strand breakage in the path to an individually motor-driven yarn strand takeup device by monitoring changes in motor conditions responsive thereto.

It is another object to provide motor-driven yarn takeup means with closed-loop motor control system in which abrupt changes in the operating conditions of the motor at the time of yarn breakage are detected and employed to signal yarn breakage and stop the motor and yarn takeup without the necessity of additional optical, electrical, or mechanical sensing means located in the yarn path to the yarn takeup station.

SUMMARY OF THE INVENTION

In the closed-loop motor control system for carrying out the present invention, a rotor position sensor provides waveforms to a microprocessor which generates signals used to control the commutation, or switching of current, to the phase windings of the motor. These control signals generated by the microprocessor have two states, on and off. The duration of the on state is identified herein as the conduction angle, or pulse width.

By means of the closed loop motor control system herein described, and by monitoring controller state variables, a yarn break end-down can be detected as a sudden change of torque load on the motor of an individually driven spindle of the ring spinning frame. Since the yarn spinning process requires a relatively constant torque from the motor drive in normal operation, the torque demand in normal yarn package build is not significantly changed instantaneously. For individually driven spindle assemblies and any similar winding operations which have relatively constant, steady state torque loads during normal winding conditions, it is possible to detect sudden decreases in the torque load during yarn breakage.

It has been found that in a typical ring spinning process employing velocity control of the motor-driven take-up packages, a ten to twenty percent decrease in motor power occurs to maintain constant motor speed when an end breaks during the winding operation. The conduction angle, or pulse width, signals supplied to a phase windings of the motor to maintain constant velocity decreases by approximately the same percentage almost instantaneously as the closed-loop control system filter compensates for the sudden change in load caused by the yarn end breaking. By monitoring the duration of the conduction angles to detect any large instantaneous changes therein, e.g., 10 to 30 percent, the motor control system can provide signal information and automatically cutoff power to a motor when a yarn break occurs, without the need of additional mechanical or optical sensors, or electrical circuitry or components, for this purpose. This results in cost saving of additional sensors, associated wiring, and control electronics.

BRIEF DESCRIPTION OF THE DRAWINGS

The above listed objects as well as other objects of the present invention will become more apparent and the invention will be better understood from the following detailed description of preferred embodiments of the invention, when taken together with the accompanying drawings, in which.

DETAILED DESCRIPTION OF PREFERRED EMBODIMENTS

Figure 1:
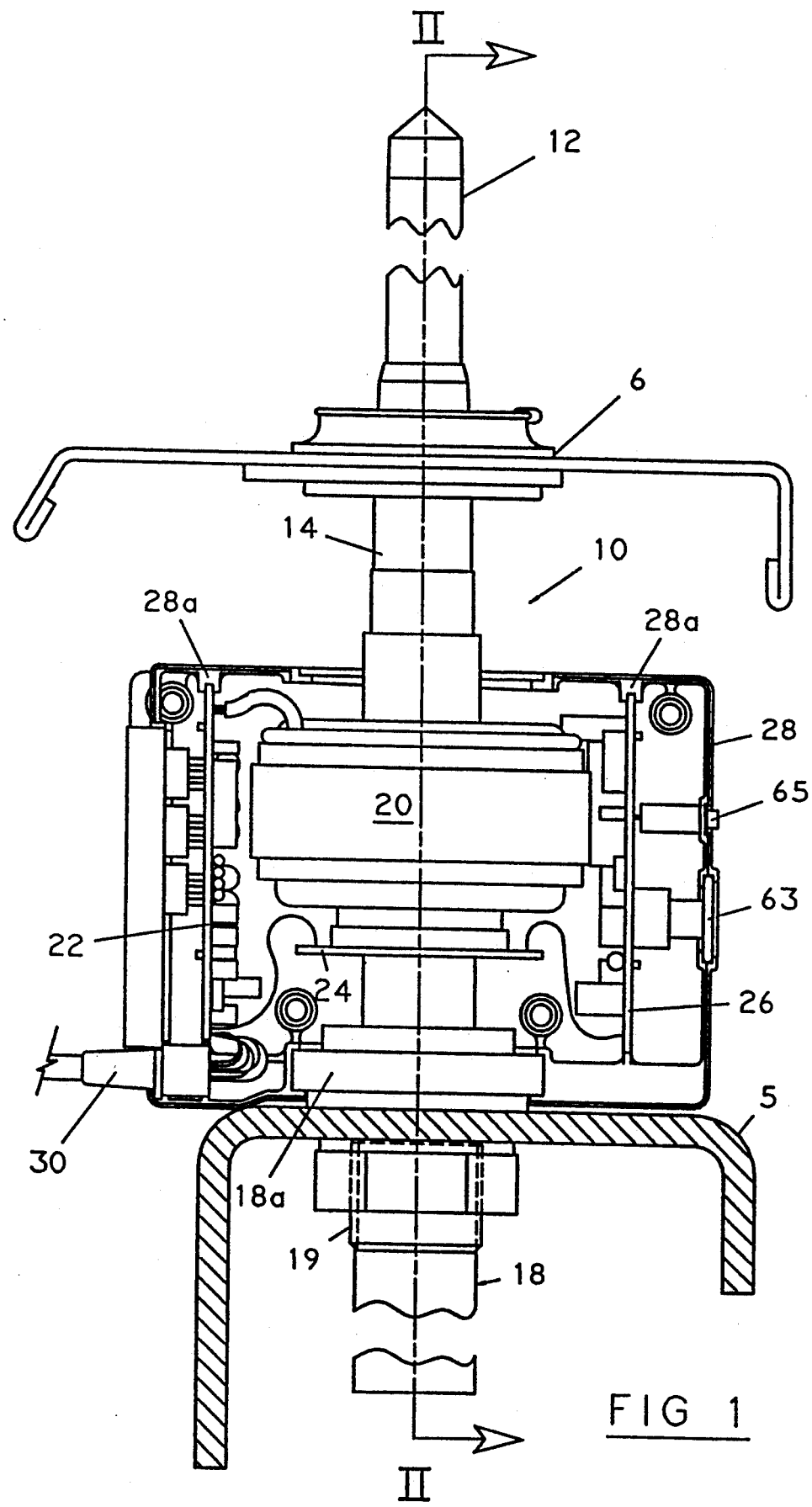
FIG. 1 is an elevation view of a motor-driven spindle assembly of a textile ring spinning frame, with a side cover plate of the spindle motor housing removed to show the motor and motor control circuit boards located in the housing.

Referring more particularly to the drawings, FIG. 1 is an elevation view of a motor-driven spindle assembly 10, such as may be employed at each winding position on a textile ring spinning frame. Such a spinning frame is schematically illustrated in FIG. 1 and includes a support member 5 of a ring spinning frame, and a vertically reciprocatable ring rail, ring, and traveler 6.

Figure 2:
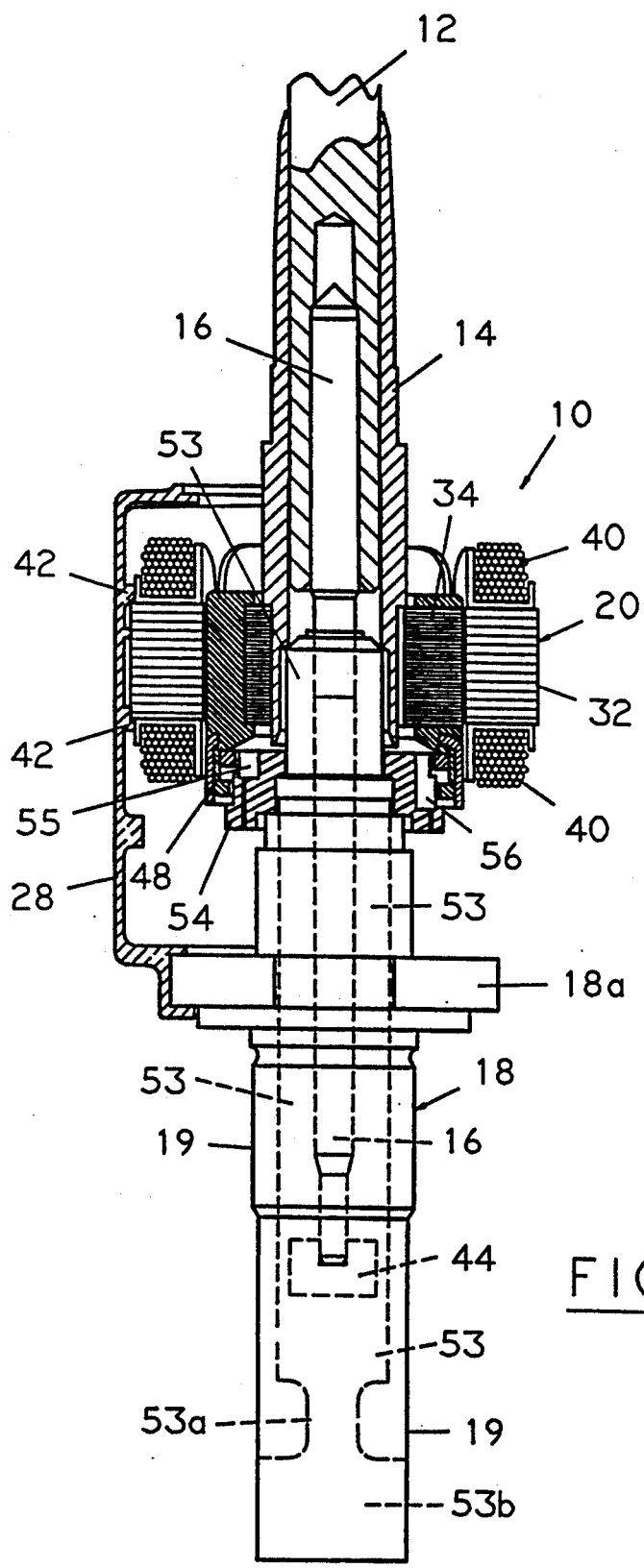
FIG. 2 is a left side, partial elevation view of the motor-driven spindle assembly as seen in FIG. 1, with portions of then spinning frame elements, motor housing, and the circuit boards removed, and with portions of the motor and housing shown in vertical section taken generally along II—II of FIG. 1.
Figure 2A:
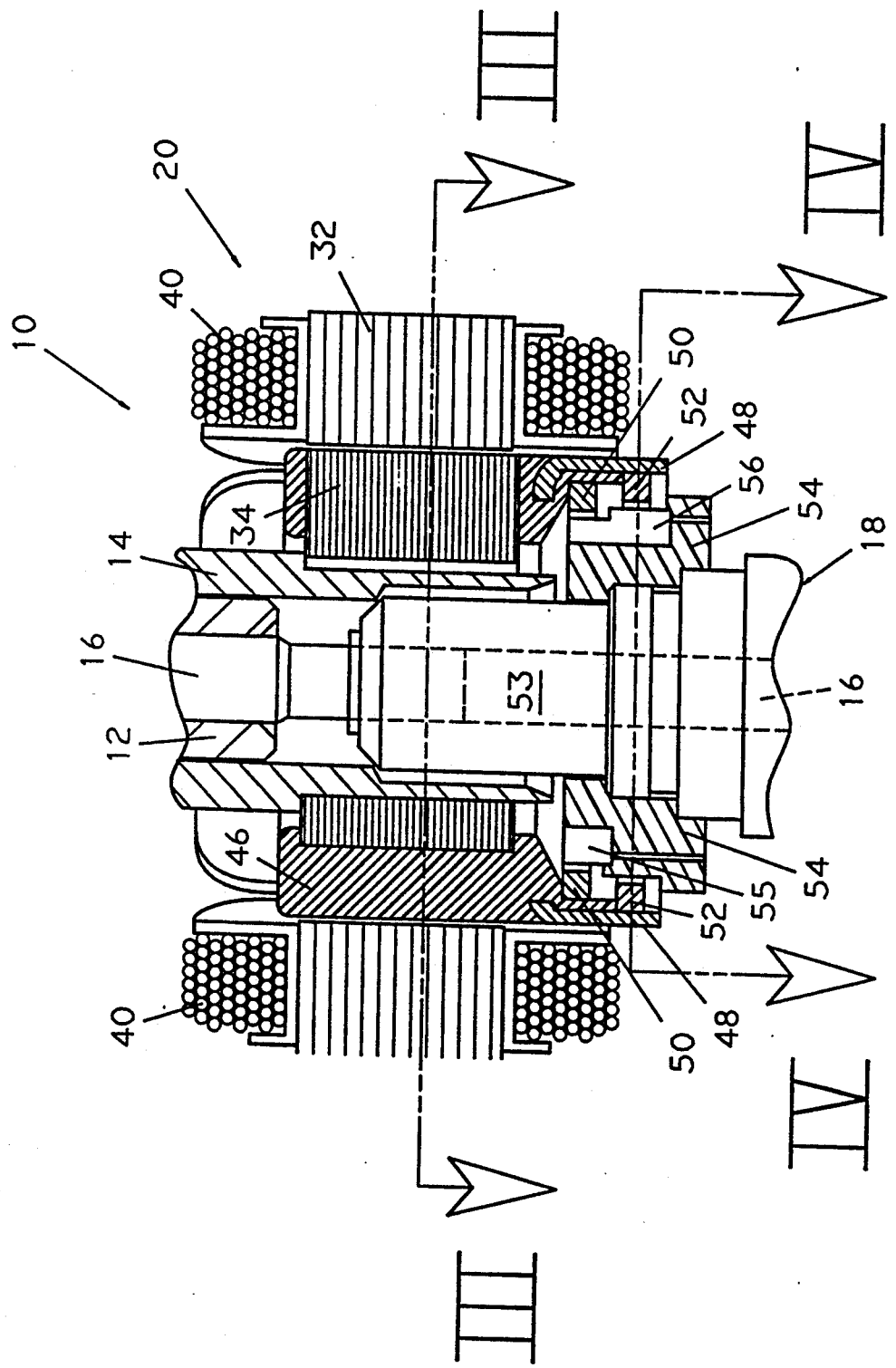
FIG. 2a is an enlarged view of a central portion of the vertical section view of the spindle assembly seen in FIG. 2.

As shown in FIG. 1, 2, and 2a, the spindle assembly 10, portions of which have been removed for convenience, includes yarn package-receiving means comprising shaft means including a sheath 12, a rotor sleeve 14, and a spindle blade 16 mounted for rotation in a supporting bolster section 18. Bolster section 18 includes an outer housing 19 which is mounted in fixed position on horizontal support member 5 of a spinning frame. Surrounding the rotational axis of the spindle assembly are the conventional ring rail package builder 6 and shaft means drive means which includes a VR motor 20. Motor 20, and motor control means, the components of which are mounted on electrically connected electronic circuit boards 22, 24, and 26, are located in a protective housing 28 which is supportably attached in fixed position to a flange portion 18a of the bolster section.

As seen in FIG. 1, circuit boards 22 and 26 are supportably mounted in trackways 28a of the housing and circuit board 24 is supportably mounted on an upper end portion of bolster section 18 in spaced relation to the lower end of motor 20. The motor and motor control system components located on the circuit boards receive power and further control signals from a power supply and a master controller for the ring spinning frame (not shown), through a power and communication supply line 30.

Figure 3:
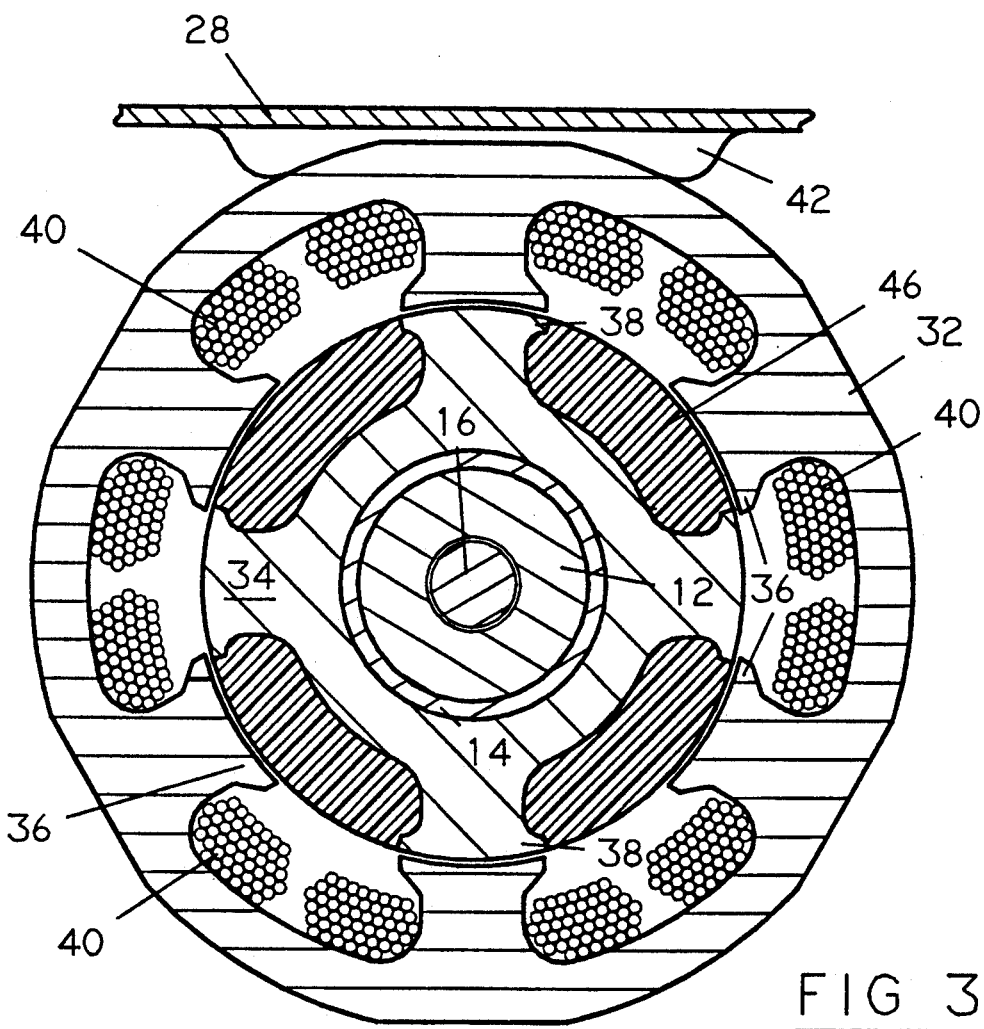
FIG. 3 is a horizontal cross-sectional view of the spindle assembly. taken generally along Line III—III of FIG. 2a and looking in the direction of the arrows.

FIG. 2 is a left side elevation view of the spindle assembly of FIG. 1, with circuit boards and portions of the motor housing removed. Portions of the motor 20, sheath 12, and rotor sleeve 14 are shown in vertical section. Referring to FIGS. 2, 2a, and 3, the VR motor 20 comprises a stator 32 and rotor 34. Stator 32 is composed of laminated sheets of steel and has six salient inwardly facing poles 36. Rotor 34 is composed of laminated steel sheets and has four outwardly facing salient poles 38 (FIG. 3). Stator poles 36 are provided with phase windings 40, with radially opposed pairs of salient stator poles being wound in series to form a three-phase motor. The phase windings of the stator are sequentially energized with current pulse to create a magnetic fiel and attract the rotor poles adjacent thereto, causing rotation of the rotor, rotor sleeve, and sheath.

As best seen in FIGS. 2 and 3, the stator is supported in fixed position in the motor housing 28 on inwardly protruding stator support ledges 42 of the housing. Rotor 34 of the motor is supportably mounted for rotation inside the stator through its fixed attachment to rotor sleeve 14 which is fixed for rotation with the sheath 12. Sheath 12 is in turn fixed for rotation with blade 16, the lower end which is supported for rotation in a bearing cup 44 located in a lower portion of bolster section 18.

Spaces between salient rotor poles are filled with nylon plastic material 46 (FIGS. 2a and 3) in which a metal ring 48 is supportably embedded for rotation with rotor 34. Adhesively secured within metal ring 48 are upper and lower magnetic rings 50, 52. Magnetic rings 50, 52 thus rotate with rotor 34 about the central longitudinal axis of the spindle assembly during motor operation.

Figure 4:
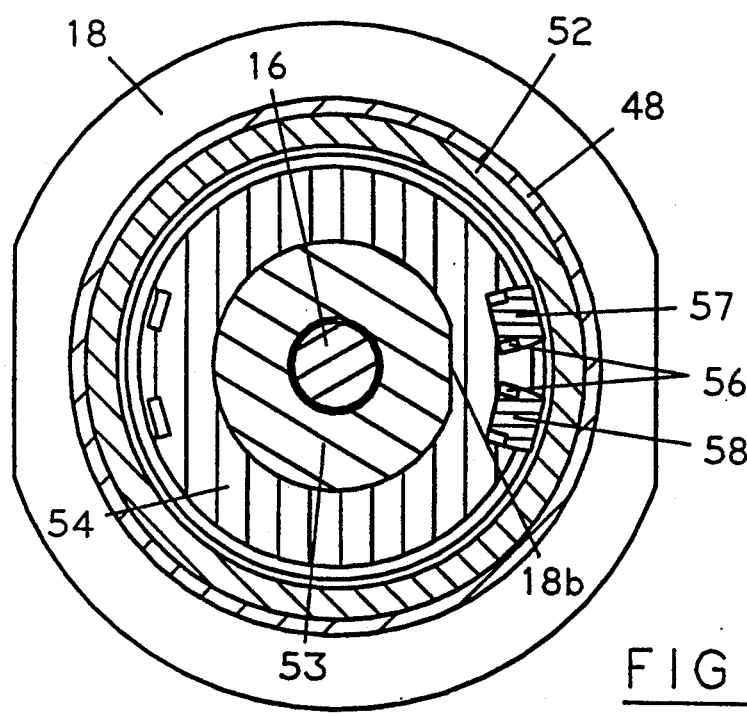
FIG. 4 is a horizontal cross-sectional view of the spindle assembly, taken generally along Line IV—IV of FIG. 2a and looking in the direction of the arrows.

Fixedly mounted to an upper end portion of an internal sleeve member 53 of bolster section 18 is a molded plastic ring 54 which serves to support sensing means which operate in conjunction with the rotating magnetic rings 50, 52 to provide signal information for velocity control and commutation of the motor phase windings, respectively. Support ring 54 is positively fixed in its angular position surrounding an upper end portion of sleeve member 53 of bolster section 18 by mating, flattened sections, seen at 18b, on the bolster sleeve member 53 and ring 54 (FIG. 4). Located in vertically spaced, horizontal planes in support ring 54 are arcuately disposed pairs of pockets 55, 56 (one of each pair seen in FIG. 2a). Each of the two pairs of pockets receive and positively fix the position of sensing means, such as conventional, latched Hall effect sensors, on sleeve 53. Two Hall effect sensors (not shown in pockets in FIG. 2a) are located in two 30° arcuately spaced pockets 55 adjacent the upper magnetic ring 50 for velocity sensing. Two Hall effect sensors 57, 58 (FIG. 4) are correspondingly located in 30° arcuately spaced pockets 56 adjacent the lower magnetic ring 52 to sense the passage of alternating magnetic poles of ring 52 for commutation of the motor phase windings. (See FIGS. 2a, 4, and 5).

Details of the means for mounting the sensing means on the upper end of sleeve member 53 and relative to the path of rotation of the magnetic rings 50, 52 during motor operation form the subject matter of a commonly assigned co-pending application entitled "Improved Motor Driven Spindle Assembly for Ring Spinning, "Ser. No.07/752,377 Aug. 30, 1991.

Figure 5:
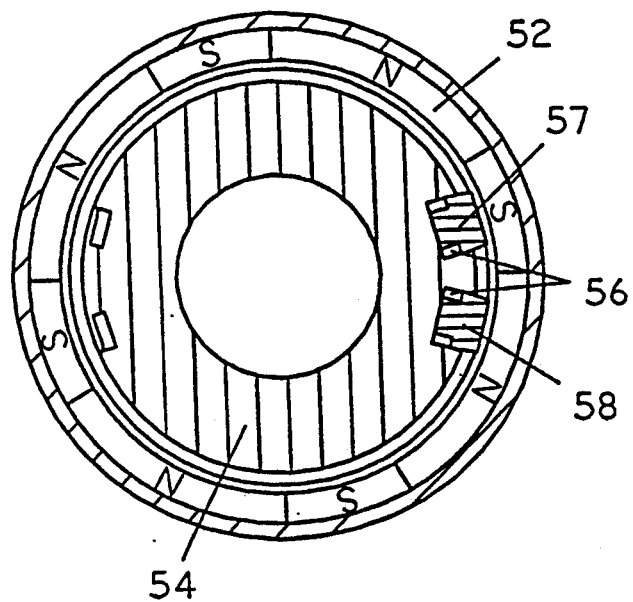
FIG. 5 is a schematic representation of the spindle assembly, as seen in FIG. 4, illustrating the positional arrangement of the means for determining rotor/stator positions of the motor for commutation of the motor.

FIGS. 4 and 5, which are cross-sectional and schematic views taken generally along Line IV—IV of FIG. 2, show the rotor/stator position detection means which provide signal information for commutation of the phase windings of the three-phase VR motor 20. As illustrated in FIG. 5, magnetic ring 52 which is mounted for rotation with rotor 34 has alternating North and South poles of unequal arcuate pole lengths, i.e., 60° and 30°, throughout the 360° extent of the ring. During rotor rotation, the passage of the alternating poles of unequal length are sensed by the two arcuately spaced Hall effect sensors 57, 58 which are fixed against rotation in sensor support ring 54 attached to bolster sleeve insert 53. Sensors 57, 58 are arcuately spaced 30° apart, adjacent the path of rotation of magnetic ring 52.

Details of the use of a magnetic ring having unequal alternating North and South poles to permit commutation of a three phase VR motor by the use of only two arcuately spaced sensors form the subject matter of commonly assigned, co-pending application entitled "Improved Apparatus for Commutation of an Electric Motor, "Ser. No. 07/752,734 filed Aug. 30, 1991.

Figure 6:
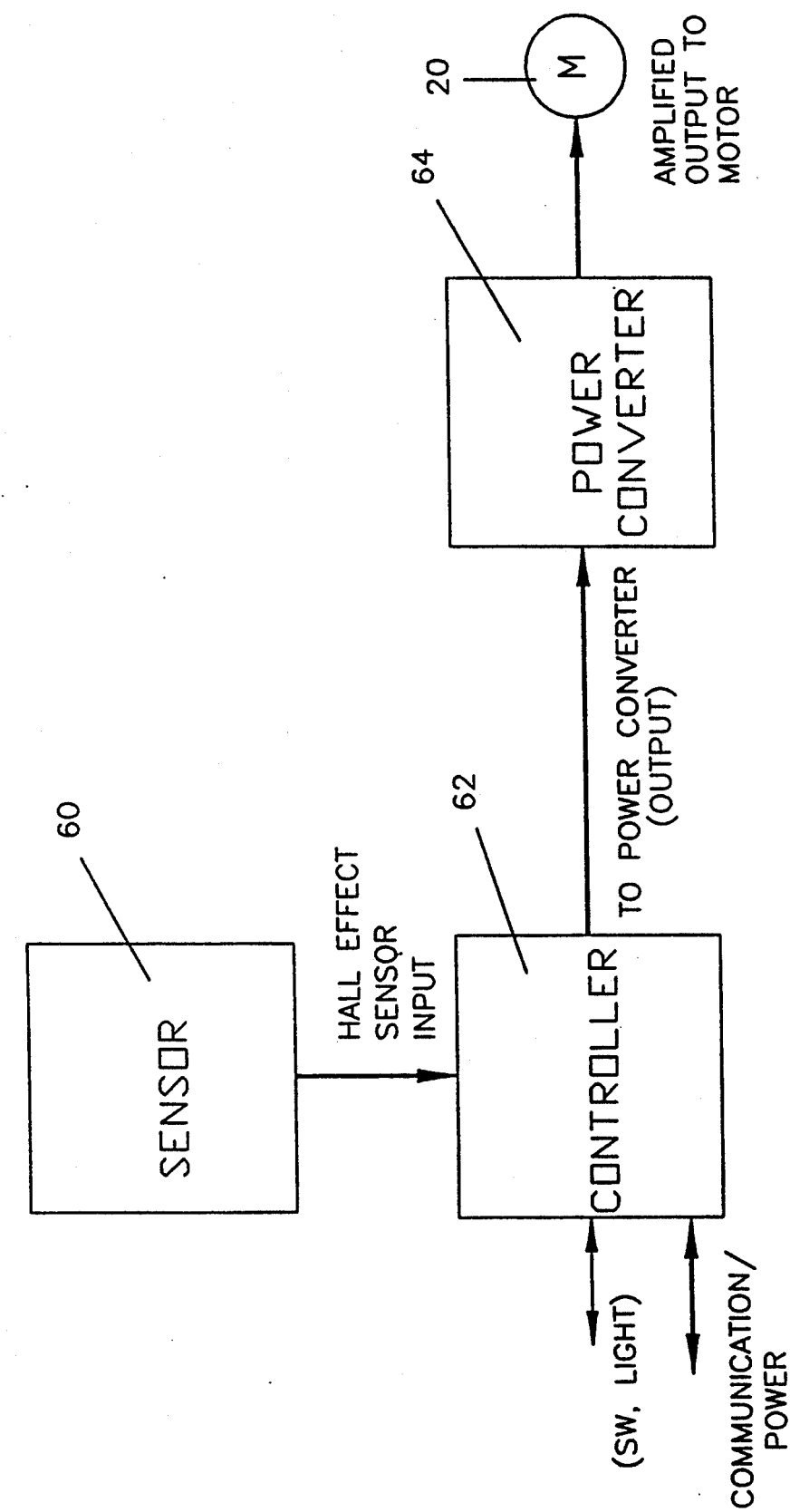
FIG. 6 is an illustrative block diagram showing principal sections of the motor control system of the present invention.

The closed loop motor control system for operating VR motor 20 may best be described and understood by reference to FIGS. 6 through 9 of the drawings which are block diagrams illustrating operative interconnection of the major sections and components of the control system. As seen in FIG. 6, the control system principally comprises three sections, a sensor section 60 for sensing rotor velocity and stator/rotor position of the motor, a controller section 62, and an amplifier, or power converter, section 64. The component parts of sensor section 60 are located conveniently on circuit board 24, as seen in FIG. 1. Controller section 62 components parts are located conveniently on circuit board 26, and component parts of power converter section 64 are located on circuit board 22.

Figure 7:
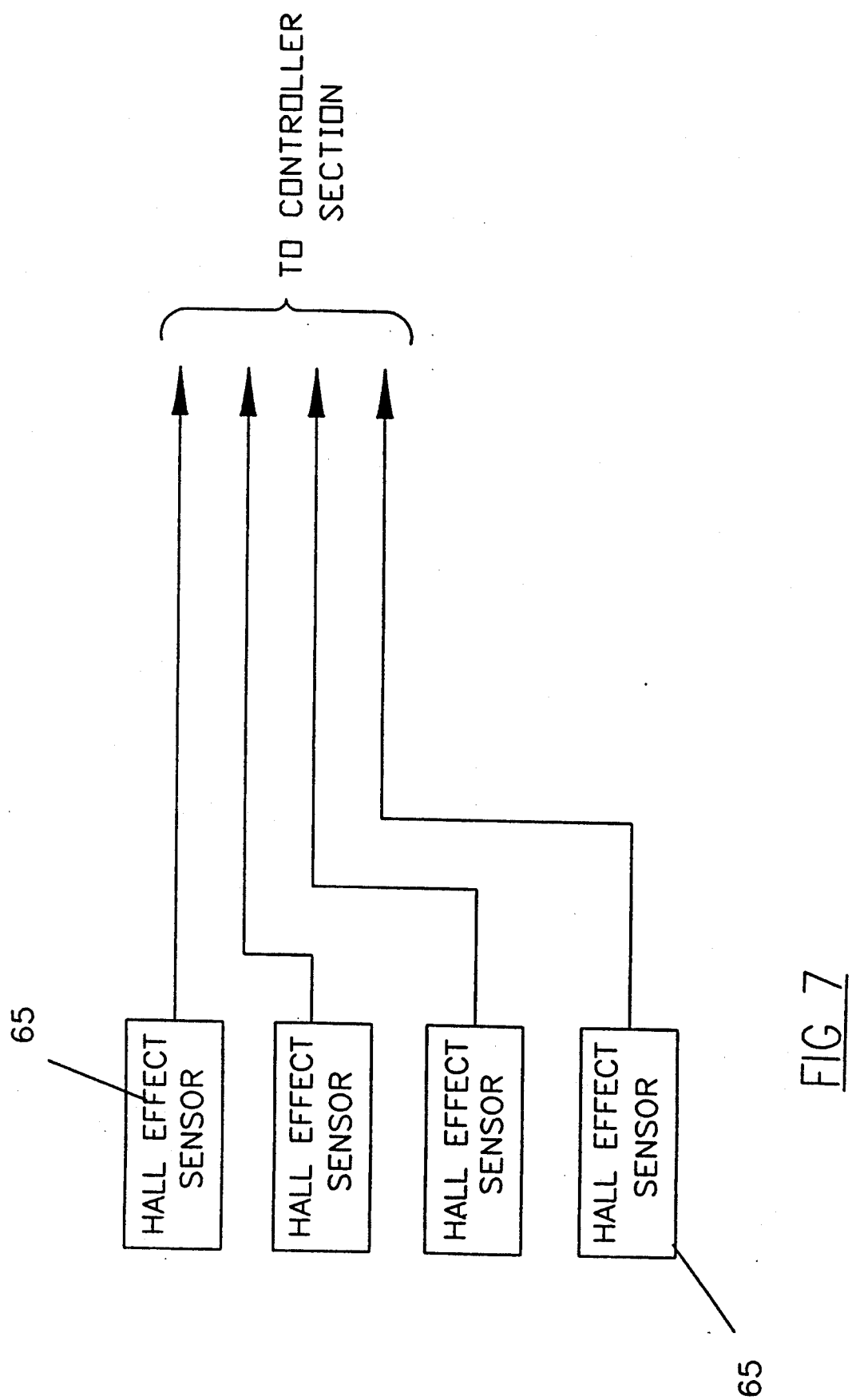
FIG. 7 is an illustrative block diagram showing components of the sensor section of the motor control system shown in FIG. 6.

As seen in FIG. 7, sensor section 60 for detecting velocity and rotor/stator position of the motor during operation contain sensor means, such as four Sprague UGN 3135 U, latched, Hall effect sensors 65, and four Allen-Bradley RC07GF332J 3.3 KOHM, ¼ watt resistors for pulling up the open collector output of the sensors. As described, these sensors sense the passage of the alternating North and South poles of the two ring magnets 50, 52 attached to the rotor. One set of two Hall effect sensors in 30° arcuately spaced pockets 55 (one pocket seen in FIG. 2a) sense passage of equal length North and South poles of a 60 pole ring magnet 50 to provide a 120 line quadrature encoder for motor velocity control. The second set of Hall effect sensors 57, 58 (FIGS. 4 and 5) in pockets 56 sense the North and South poles of magnet 52 to provide signals for commutation.

Figure 8:
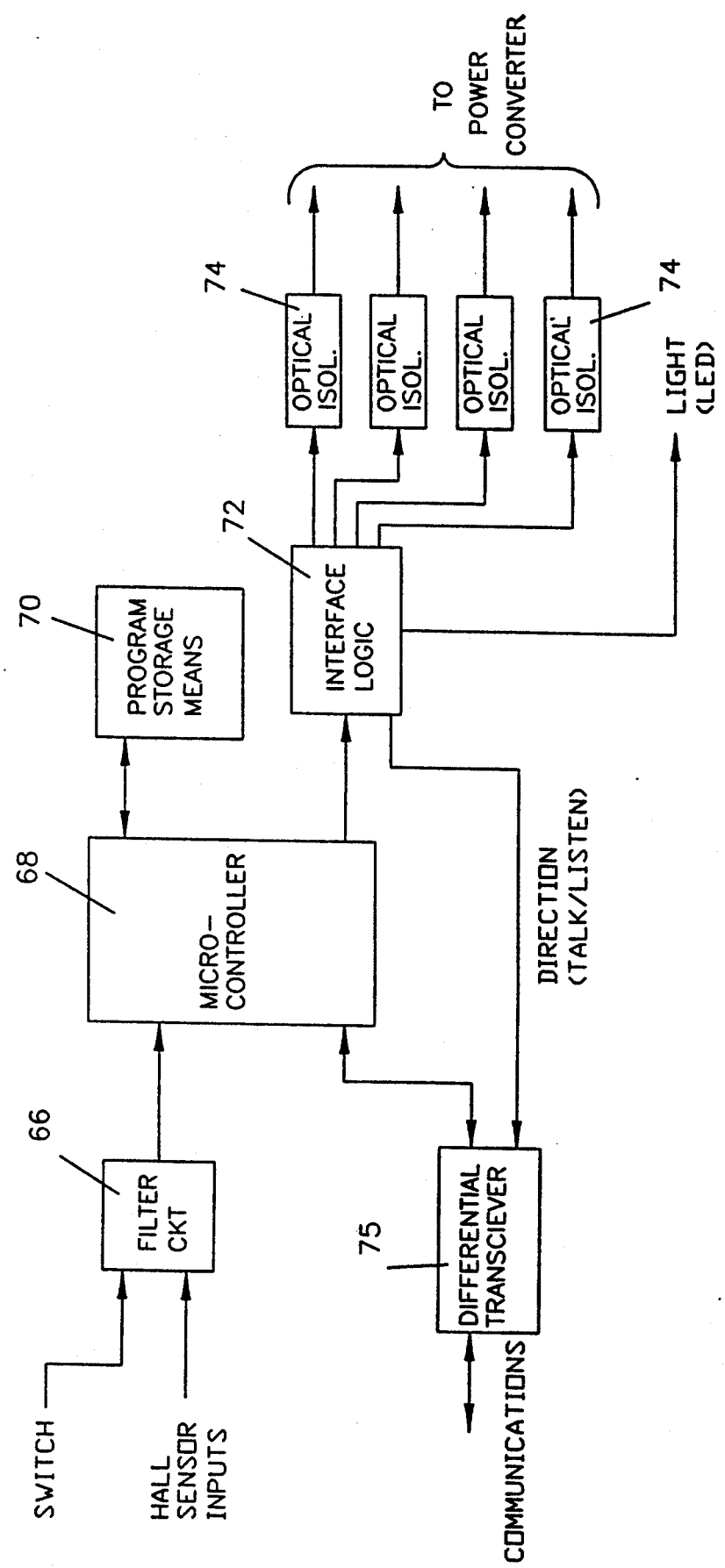
FIG. 8 is an illustrative block diagram showing components of the controller section of the motor control system shown in FIG. 6.

Controller section 62 components, as seen in FIG. 8, include a filter circuit 66 for receiving input signals from the sensor section 60, and for transmitting such signals, after filtering, to a microcontroller 68 which processes and executes a control program supplied thereto from program storage means 70, such as a ROM or EPROM. Process information from microcontroller 68 is processed through an interface logic component 72 and transmitted via optical isolators 74 to power converter section 64 of the control system.

Controller section 62 contains the circuits which perform velocity control, input, output, and commutation functions. Typically the filter circuit 66 in this section may comprise four Kemet C315C103M5U5CA 0.01 uF 50 Volt radial lead ceramic capacitors for filtering the incoming Hall effect sensor signals, and a National Semiconductor 74HC14N Hex Schmitt Triggered Inverter for sharpening the edges of the filtered signals from the Hall effect sensors and the output signal from a manual off/on switch 63 (FIG. 1) of the motor 20, such as an ITT-Schadow D602-01 momentary single-pole-single-throw (normally open) push-button switch. The Schmitt Triggered Inverter also buffers the control signal for an indicator light 65 (FIG. 1), such as a Light Emitting Diode.

Microcontroller 68 may be an Intel N80C194 16 bit, 12 MHz microcontroller processor which executes the control program stored in storage means 70, which may be a ROM storage device, such as an Intel N87C257-170V10 latched EPROM.

In the interface logic 72, a National Semiconductor 74HC08N quad AND gate provides multiplexing and interface functions for the output signals from the microcontroller to the four optical isolators 74, which may be Motorola MOC5008 optical isolators. A National Semiconductor 74HC174N hex D flip flop is connected to the multiplexed address/data bus of the microcontroller 68 in order to latch outputs which control a differential transceiver 75, which may be a National Semiconductor UA 96176 RS-485 transceiver, and the LED 65 (FIG. 1). Three Allen-Bradley RC07GF332J 10 KOhm ¼ Watt resistors are used to pull up two unused high impedance inputs and to bias the receive data line to a logical one. A Kemet T350B685MO10AS 6.8 uF tantalum 20 Volt radial lead capacitor is used to provide the power-up reset RC time constant. Two Kemet C315C330K2G5CA 33 pF ultra-stable ceramic 200 Volt radial lead capacitors are used in conjunction with a 12.0000 MHz crystal to form the oscillator circuit providing the 12 MHz timebase for the microcontroller. An Allen-Bradley RC07GF121J 120 Ohm ¼ watt resistor is used to terminate the differential pair communications line. Eight Kemet C315C104M5U5CA 0.1 uF 50 Volt ceramic radial lead capacitors, one Kemet T350A105M020AS1 uF tantalum 20 Volt radial lead capacitor and one Kemet T350F336M010AS 33 uF tantalum radial lead capacitor are used for general decoupling throughout the controller circuit to minimize noise transients.

Figure 9:
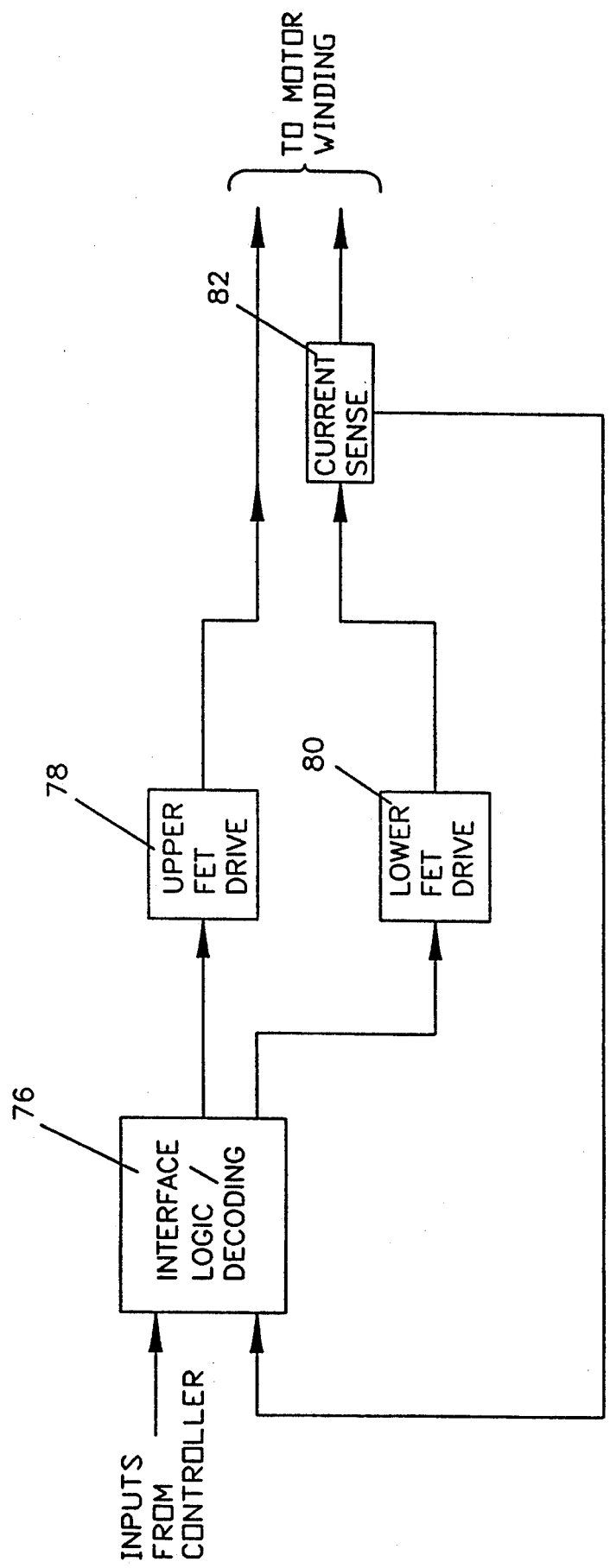
FIG. 9 is an illustrative block diagram showing components of the power converter section of the motor control system shown in FIG. 6.
Figure 10:
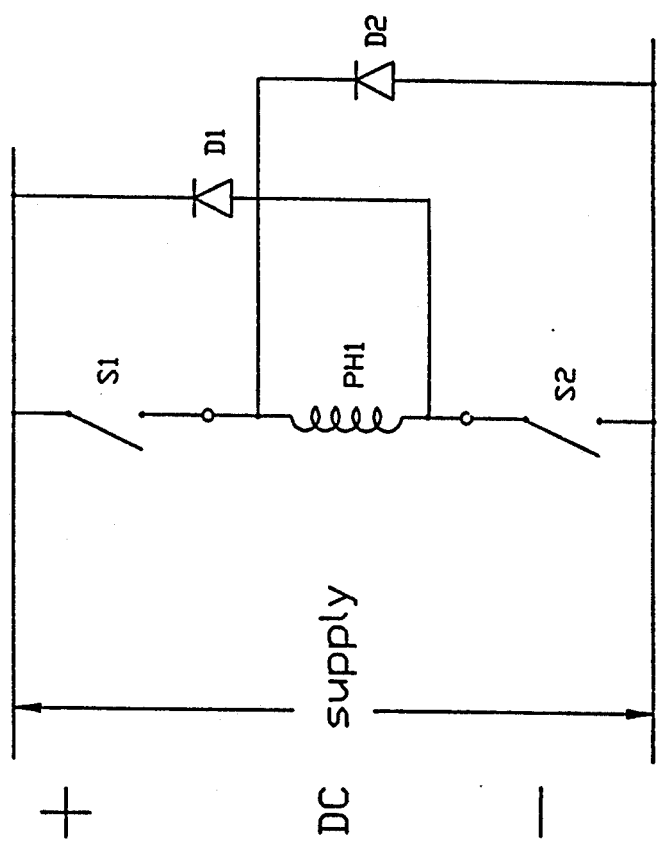
FIG. 10 is an electrical schematic diagram of one of the switch means components of the power converter section of the motor control system showing the switch arrangement for supplying current to one phase winding of the spindle assembly drive motor.

As shown in FIG. 9, inputs from the four optical isolators 74 of the controller section 62 pass through an interface logic/decoder 76 of the power converter section 64 to upper and lower motor winding switch means 78, 80, which may consist of a plurality of field effect transistors each having an associated circuit for turn-on and turn-off. Operation of the switch means supplies current to the three phase windings of VR motor 20. Three of the four optically isolated signals from the controller section 62 control the motor phases directly and interface to a quad OR gate (such as a National Semiconductor 74C02N) in decoder 76 which allows the windings to be turned off in the event of over current. These phase control signals are buffered by a line driver (such as a National Semiconductor 74C240N) in decoder 76 and then operate switches S1 and S2 of each phase winding circuit PH1, as illustrated in FIG. 10. These switches may be three International Rectifier IRF 730 N channel Field Effect Transistors in the lower switch means 80 and three Motorola MTP2P45 P channel FETs in the upper switch means (FIG. 9).

Ultra fast recovery diodes D1, D2, such as Motorola MUR 440 diodes, are used as regeneration diodes. They allow the energy stored in the winding to be returned to the supply when the winding is turned off.

The current limit component 82 of the power converter is implemented using four operational amplifiers such as a National Semiconductor LM324N quad operational amplifier integrated circuit. In conjunction with the appropriate commercially available resistors, a voltage, which is proportional to the current in the motor windings, is compared to some reference voltage and an output signal which causes switcher S1 and S2 to be turned off is generated if the current in the motor windings exceeds the maximum allowed current.

Figure 5A:
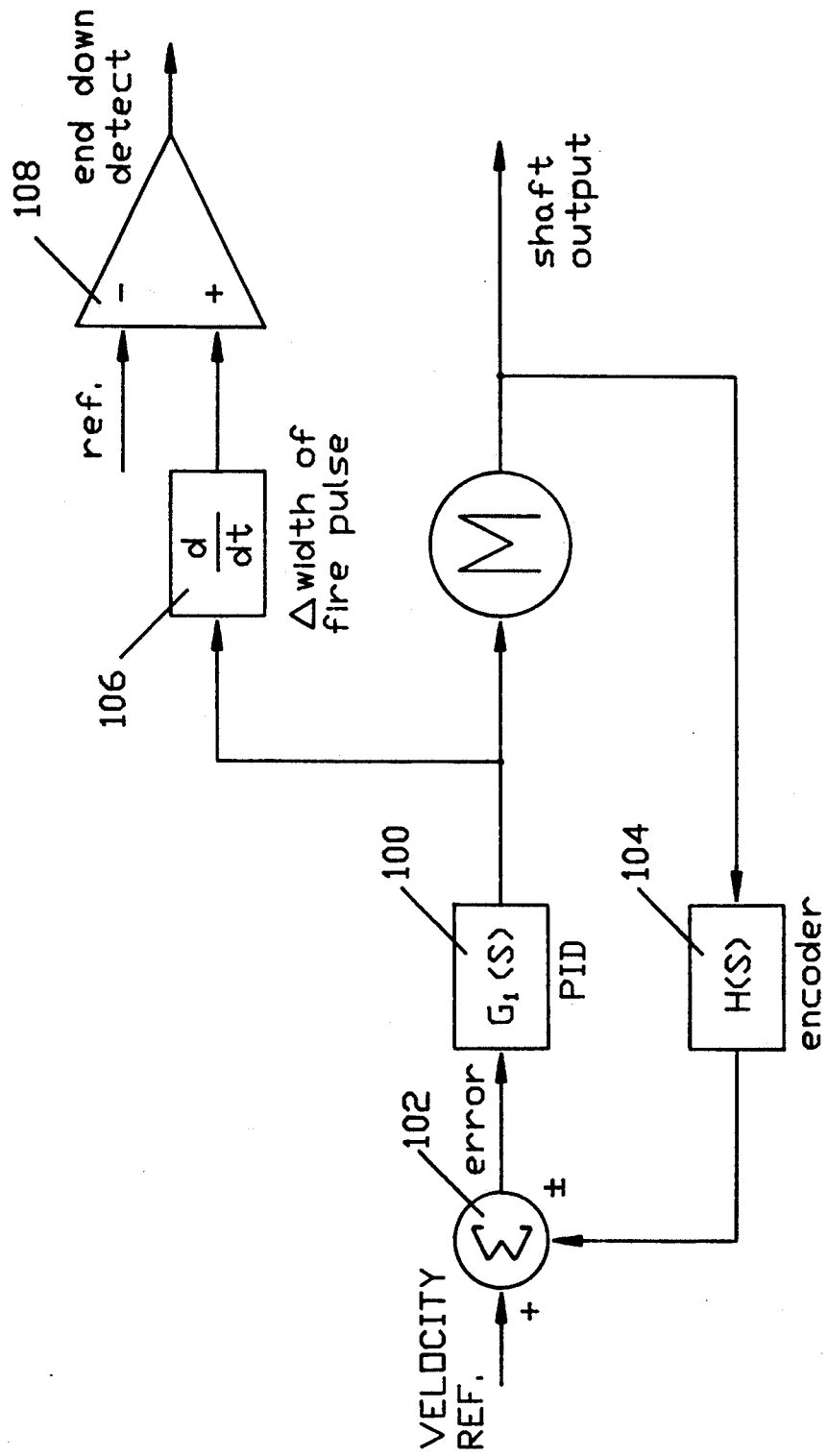
FIG. 5a is a block diagram illustrating a closed-loop control system for detecting a yarn end down condition by monitor of sudden large changes in the conduction angle during motor commutation.

FIG. 5a shows the detection of an end down condition by monitoring controller state variables and detecting sudden changes in output of a proportional integral derivative (PID) filter 100. The PID filter output ultimately determines the conduction angle which is required to maintain the selected reference motor velocity. FIG. 5a indicates that a chosen reference velocity is an input to a summing junction 102. Another input to junction 102 is actual velocity as indicated by an encoder 104 (which has an arbitrary transfer function H(S)). Encoder 104 receives signals from the velocity sensing means on the rotor and stator of the motor M. The output of summing junction 102, expressed as velocity error, is input to the PID filter 100 which has another arbitrary transfer function $G_1(S)$. $G_1(S)$ produces a signal which periodically changes so as to maintain substantially constant rotational velocity of the motor M. A differentiation element 106 has an output proportional to the change in $G_1(S)$ output which is compared in comparator 108 to a reference signal. The end down condition is indicated by a large change in $G_1(S)$ output in a short period of time, typically a 15% change in 250 milliseconds.

Motor control information for yarn end down detection typically may be stored and transferred between the various components of the controller section 62, as follows. The microcontroller 68 executes a program which is stored in storage means 70 which may be an external non-volatile ROM. Microcontroller 68 includes an internal volatile RAM which is used to store all variable data.

Two separate modules of program which operate jointly to detect the yarn end down condition is a proportional integral derivative (PID) filter routine for velocity control, and an end down detection routine. The microcontroller inputs to the PID routine are a chosen reference velocity for the motor and the actual velocity of the motor, both of which values are stored in internal RAM memory locations. The output of the PID routine is a value which indicates the required conduction angle necessary to maintain an actual motor velocity substantially equal to the chosen reference velocity.

After the PID routine has determined the required conduction angle for velocity control and has stored this value in the RAM, the ends down detection routine uses the RAM to store conduction angles to determine when a large decrease, e.g., generally a minimum of 10% occurs in the conduction angle, or duration of the current supply, to the motor windings. When such change is detected, this information is stored in the RAM to indicate an end down. A logical output from the microcontroller provides a signal through the power converter section to stop the current flow to the motor driving the yarn support package in which a yarn break occurs. The stored information in the RAM of the microcontroller is accessible via the communications line.

That which is claimed is:

1. In textile yarn winding apparatus having a commutated DC motor for rotatably driving a yarn package support member to wind a yarn strand thereon, and closed-loop motor control means for maintaining a desired velocity of the motor and for signaling commutation of the phase of the motor during yarn winding operations; the improvement therein comprising means for monitoring the conduction angles delivered to commutate the phase windings of the motor, means for detecting a sudden minimum preestablished decrease in the monitored conduction angles indicative of breakage of a yarn strand being wound on the yarn package support member, and means for generating a control signal in response to said sudden decrease in conduction angle indicative of yarn strand breakage.

2. Apparatus as defined in claim 1 wherein said means for detecting a sudden decrease in conduction angle detects a decrease of a minimum of 10 percent.

3. Apparatus as defined in claim 1 including means for stopping current supply to the motor in response to said generated control signals.

4. Apparatus as defined in claim 1 including means for storing the detection of a decrease in the monitored conduction angles for later accessibility.

5. A method of detecting breakage in a yarn strand being wound onto a yarn support member rotatably driven by a DC motor having closed loop motor control means for maintaining a desired velocity of the motor and for signaling commutation of the phases of the motor during yarn winding operations; comprising the steps of monitoring the width of the conduction angles delivered to commutate the phase windings of the motor, detecting a sudden minimum preestablished decrease in the monitored conduction angles indicative of breakage of a yarn strand being wound onto the yarn package support member, and generating a control signal in response to said sudden decrease in conduction angle indicative of yarn strand breakage.

6. A method as defined in claim 5 wherein said minimum preestablished decrease in the monitored conduction angles is a minimum of 10%.

7. A method as defined in claim 5 including the step of stopping current supply to the motor in response to said generated control signals.

8. A method as defined in claim 5 including the step of storing the detection of a decrease in the monitored conduction angles for later accessibility.

* * * * *

UNITED STATES PATENT AND TRADEMARK OFFICE
CERTIFICATE OF CORRECTION

PATENT NO. : 5,202,610

DATED : April 13, 1993

INVENTOR(S) : Jesse Craig Frye and Scott Gary Bradshaw

It is certified that error appears in the above-identified patent and that said Letters Patent is hereby corrected as shown below:

Column 1, line 54, change "reactor" to --rotor--

Column 2, line 1, change "comprises" to --comprise--; line 20, change "communication" to --commutation--

Column 3, line 4, change "a" before "phase" to --the--; line 36, before "II-II" insert --Line--

Column 4, line 53, change "pulse" to --pulses--; line 53, change "fiel" to --field--

Column 5, line 37, before "Aug. 30, 1991" insert --filed--; line 59, reverse the direction of the quotation mark Column 6, lines 3 and 4, change "components" to --component--

Column 8, line 13, before "program" insert --a--; line 46, change "phase" to --phases--

Signed and Sealed this

Eleventh Day of January, 1994

Attest:

BRUCE LEHMAN

Attesting Officer     Commissioner of Patents and Trademarks